United States Patent [19]
Nakajima et al.

[11] Patent Number: 5,328,714
[45] Date of Patent: Jul. 12, 1994

[54] METHOD FOR MANUFACTURING LIQUID CRYSTAL ORIENTATION FILM

[75] Inventors: Yasushi Nakajima, Hachioji; Makoto Murata; Masakazu Uekita, both of Kobe, all of Japan

[73] Assignees: Kanegafuchi Kagaku Kogyo Kabushiki Kaisha, Osaka; Casio Computer Co. Ltd. JP, Tokyo, both of Japan

[21] Appl. No.: 969,155

[22] PCT Filed: Jun. 24, 1992

[86] PCT No.: PCT/JP92/00801

§ 371 Date: Feb. 16, 1993

§ 102(e) Date: Feb. 16, 1993

[87] PCT Pub. No.: WO93/00604

PCT Pub. Date: Jan. 7, 1993

[30] Foreign Application Priority Data

Jun. 24, 1991 [JP] Japan .................................. 3-180253

[51] Int. Cl.$^5$ ............................................. B05D 5/12
[52] U.S. Cl. .................................. 427/58; 427/430.1; 428/1
[58] Field of Search .................... 427/58, 430.1; 428/1

[56] References Cited
FOREIGN PATENT DOCUMENTS

| | | |
|---|---|---|
| 62-209415 | 9/1987 | Japan . |
| 62-209415A | 9/1987 | Japan . |
| 63-23131A | 1/1988 | Japan . |
| 63-23131 | 1/1988 | Japan . |
| 63-66540 | 3/1988 | Japan . |

*Primary Examiner*—Michael Lusignan
*Attorney, Agent, or Firm*—Armstrong, Westerman, Hattori, McLeland & Naughton

[57] ABSTRACT

A method for liquid crystal orienting film is disclosed, comprising:

a step of preparing a thin film by laminating a monomolecular film on a substrate having an electrode formed thereon, said monomolecular film being formed by spreading on water surface an amphiphilic high molecular material having a repeating unit as represented by the following general formula (1):

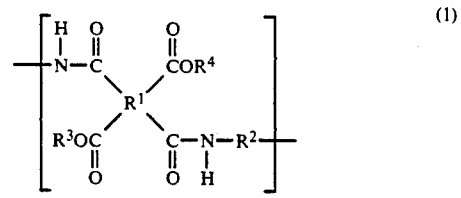

wherein $R^1$ is a tetravalent group containing at least two carbon atoms, $R^2$ is a divalent group containing at least two carbon atoms and each of $R^3$ and $R^4$ is an aliphatic, an alicyclic or an aromatic monovalent group having 1–30 carbon atoms or combinations thereof, which may be substituted by a halogen atom, a nitro group, an amino group, a cyano group, a methoxy group or an acetoxy group, or a hydrogen atom, and at least one of $R^3$ and $R^4$ is an aliphatic, an alicyclic or an aromatic monovalent group having 12–30 carbon atoms or combinations thereof, which may be substituted by a halogen atom, a nitro group, an amino group, a cyano group, a methoxy group or an acetoxy group, and a step of partially imidizing the resulting thin film to a polyimide represented by the following general formula (2):

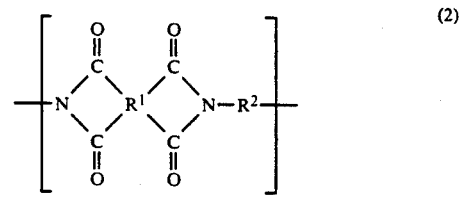

wherein $R^1$ and $R^2$ are the same as in the general formula (1), so that the monovalent group having 12–30 carbon atoms contained in the thin film remains at the ratio of 1.5–0.8 pieces per repeating unit as represented by the above general formula (1).

2 Claims, 1 Drawing Sheet

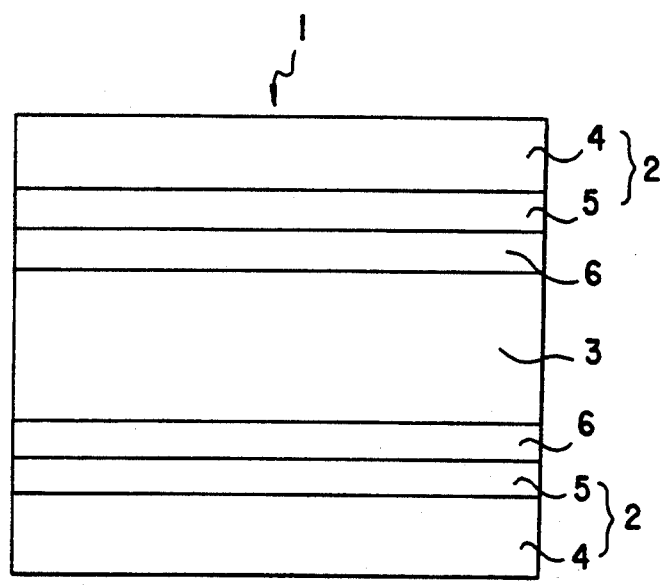

METHOD FOR MANUFACTURING LIQUID CRYSTAL ORIENTATION FILM

FIELD OF THE INVENTION

The present invention relates to a method for manufacturing a novel liquid crystal orientation film for orientating a liquid crystal used in liquid crystal devices.

BACKGROUND ART

In watches, TV sets et cetera, flat displays using liquid crystal devices are now widely employed and a liquid crystal orientation film is used in the liquid crystal device. The liquid crystal orientation film has hitherto been formed by, for example, the so-called oblique vapor deposition method in which $SiO_2$, Au or the like is deposited obliquely, or the so-called rubbing method comprising the step of coating a substrate with a polymer film such as a polyimide type resin and the step of rubbing the polymer film in a given direction by cloth or the like.

Although the liquid crystal orientation film formed by the oblique vapor deposition method is highly advantageous for imparting a given pretilt angle, but because of a vacuum deposition method, it requires a high vacuum of ca. $10^{-5}$ torr and also it is necessary to tilt the substrate, thus the method has a drawback of lacking in mass-producibility.

A liquid crystal orientation film formed by the rubbing method has a drawback of its producibility being affected by dust and static electricity resulting from rubbing and the quality of film being adversely affected.

Hence, a liquid crystal orientation film which can be formed without relying on such conventional methods has been expected.

Recently, a novel type of a liquid crystal orientation film by the use of Langmuir-Blodgett (hereinafter referred to as LB) film which do not require rubbing treatment (Japanese Laid-open Patent Publication No. 209415/1987, Japanese Laid-open Patent Publication No. 23131/1988) are proposed. When the LB film is used as a liquid crystal orientation film, it is difficult to control the pretilt angle of liquid crystal and, depending on the kind of a LB film material used, the liquid crystals are sometimes completely aligned perpendicular or perfectly parallel to the substrate, this resulting in limitation of practicality as a liquid crystal element.

The present invention has been made for solving problems of such conventional arts and is aimed at provision of a liquid crystal orientation film whose liquid crystal pretilt angle is controllable and which is uniform and free from defects.

DISCLOSURE OF THE INVENTION

The present invention relates to a method for manufacturing a liquid crystal orientation film comprising:

a step of preparing a thin film by laminating a monomolecular film on a substrate having an electrode formed thereon, said monomolecular film being formed by spreading on water surface an amphiphilic high molecular material having a repeating unit as represented by the following general formula (1):

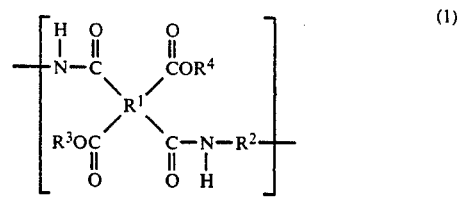

wherein $R^1$ is a tetravalent group containing at least two carbon atoms, $R^2$ is a divalent group containing at least two carbon atoms and each of $R^3$ and $R^4$ is an aliphatic, an alicyclic or an aromatic monovalent group having 1-30 carbon atoms or combinations thereof, which may be substituted by a halogen atom, a nitro group, an amino group, a cyano group, a methoxy group or an acetoxy group, or a hydrogen atom, and at least one of $R^3$ and $R^4$ is an aliphatic, an alicyclic or an aromatic monovalent group having 12-30 carbon atoms or combinations thereof, which may be substituted by a halogen atom, a nitro group, an amino group, a cyano group, a methoxy group or an acetoxy group, and a step of partially imidizing the resulting thin film to a polyimide represented by the following general formula (2):

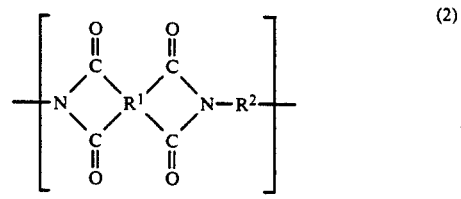

wherein $R^1$ and $R^2$ are the same as in the general formula (1), so that the monovalent group having 12-30 carbon atoms contained in the thin film remains at the ratio of 1.5-0.8 pieces per repeating unit as represented by the above general formula (1)

BRIEF DESCRIPTION OF THE DRAWING

FIG. 1 is a schematic view showing an example of the present invention.

OPTIMUM MODE OF THE INVENTION

Explained below is a preferred example of the present invention.

In FIG. 1, (1) represents a liquid crystal cell, (2) is an electrode body and (3) is a liquid crystal. The electrode body (2) comprises a glass substrate (4) and an electrode (5) formed thereon. The surface of the electrode (5) formed on the glass substrate (4) is coated with a liquid crystal orientation film (6) for the uniformity of molecular orientation of the liquid crystal. The liquid crystal orientation film (6) comprises an LB film.

An LB film in the present invention is a monomolecular film formed on water surface and is laminated on a given substrate. As methods for laminating the monomolecular film, there are known such methods as a vertical dipping method (LB method), horizontal dipping method and revolving cylindrical method. It is preferable to adopt the LB method which gives rise to fluid orientation.

In the present invention, an amphiphilic high molecular material having a repeating unit as represented by the following general formula (1):

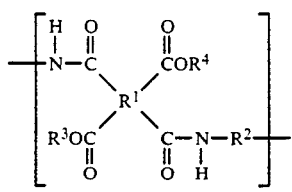

(1)

wherein $R^1$ is a tetravalent group containing at least two carbon atoms, $R^2$ is a divalent group containing at least two carbon atoms and each of $R^3$ and $R^4$ is an aliphatic, an alicyclic or an aromatic monovalent group having 1–30 carbon atoms or combinations thereof, which may be substituted by a halogen atom, a nitro group, an amino group, a cyano group, a methoxy group or an acetoxy group, or a hydrogen group, and at least one of $R^3$ and $R^4$ is an aliphatic, an alicyclic or an aromatic monovalent group having 12–30 carbon atoms or combinations thereof, which may be substituted by a halogen atom, a nitro group, an amino group, a cyano group, a methoxy group or an acetoxy group.

It is preferable to use an amphiphilic high molecular material having a repeating unit represented by the following general formula (3) in which $R^1$ and $R^2$ are specific groups, respectively.

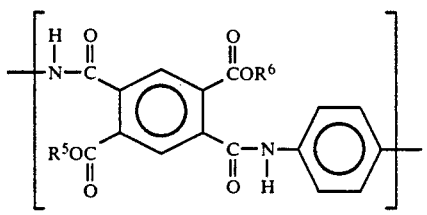

(3)

The aforementioned amphiphilic high molecular material is obtainable by condensation polymerization of an acid dianhydride and a diamine and its number average molecular weight is preferably 2000–300000, more preferably 2000–30000. If the number average molecular weight is outside the range of 2000–300000, there possibly occur such problems as too low strength of the prepared LB film or failure of LB film preparation because of too high viscosity.

A liquid crystal orientation film is obtainable by first preparing a monomolecular film by spreading on water surface the aforementioned amphiphilic high molecular material and, after obtaining a thin film by laminating it on a substrate with an electrode formed thereon, letting imidization (ring closure reaction) of the thin film of the aforementioned amphiphilic high molecular material proceed partly.

In this case, the quantity of monovalent groups having 12–30 carbon atoms contained in the amphiphilic high molecular material is one of the important factors of the present invention. The amphiphilic high molecular material represented by the general formula (1) is converted into polyimide by the progress of imidization as shown in the following general formula (2):

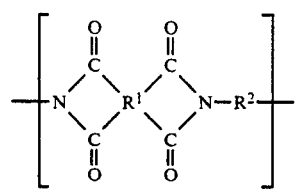

(2)

The number of the monovalent groups having 12–30 in carbon atoms contained in the aforementioned amphiphilic high molecular material per repeating unit of the high molecular material varies according to the degree of imidization.

If the number of the monovalent groups 12–30 in carbon number per repeating unit of the high molecular material is more than 1.5, the pretilt angle of the liquid crystal is approximately 90° (deg.), and therefore, this restricts practical use for the liquid crystal device. If the number of the monovalent groups 12–30 in carbon number per repeating unit of the high molecular material is too small, the pretilt angle of the liquid crystal is bound to be 0° (deg.). This results in occurrence of the so-called reverse tilt disclination or the like, and also restricts practical use for the twisted nematic type liquid crystal device.

The present inventors made intensive studies about this problem and found out that the pretilt angle of the liquid crystal is freely controllable above 0° (deg.) by adjusting the number of the monovalent groups 12–30 in carbon number per repeating unit of the high molecular material to a range of 1.5–0.8.

Imidization is feasible chemically as well as thermally, but for the accurate control of the number of monovalent groups 12–30 in carbon number per repeating unit of the high molecular material, it is desirable to conduct imidization thermally. The thermal treating temperature is 100°–400° C., preferably 150°–200° C., and the thermal treating time is not less than 10 minutes and is determined by the selected thermal treating temperature and the desired number of monovalent groups 12–30 in carbon number.

There is no particular limitation about the type of liquid crystal material or liquid crystal device and any of TN-type liquid crystal element, Guest-Host type liquid crystal element, STN-type liquid crystal element and ferroelectric liquid crystal element may be employed.

The present invention is described in greater detail below with reference to preferred examples, but it is needless to say that the invention is not limited thereto.

EXAMPLE 1

On one side of a glass substrate, ITO was vacuum vapor deposited to a thickness of 100 nm using a patterned mask. Meanwhile, an amphiphilic high molecular compound (molecular weight: ca. 10,000) obtained by the reaction of an acid chloride of pyromellitic acid distearyl ester and paraphenylene diamine, having the following formula:

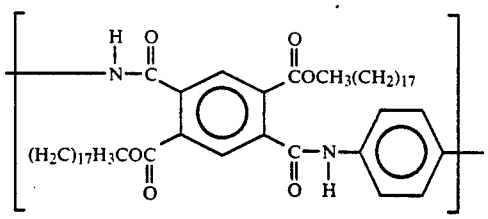

was laminated 11 layers by the LB method on the glass substrate with ITO vacuum vapor deposited thereon. Further, the glass substrate with the LB film formed thereon was heat-treated for 1 hour at 175° C.

Two sheets of the glass substrates given the aforementioned treatment were provided, a cell was prepared so that the dipping directions of the two substrates in the manufacture of LB film are perpendicular to each other and nematic liquid crystal (Merck, trade name: ZLI 1565, admixed with 0.5 weight % of Chiral agent C-15) was filled between the two substrates and was sealed with a commercially available acid anhydride hardening type epoxy resin to thus enclose the liquid crystal, thereby completing a TN-type liquid crystal cell. The completed liquid crystal cell was cooled gradually after having been heated to 100° C. to thus cause initial orientation to take place and a cell of uniform, flawless and good orientation condition was thereby obtained.

The pretilt angle of liquid crystal was measured by the magneto-captive null method using the liquid crystal cell (anti-parallel liquid crystal cell) obtained in the same way except that the cell was made up so that the substrate dipping directions in the manufacture of the two substrates were anti-parallel. The result was 13° (deg.).

The aforementioned LB film was prepared on a surface of silicon substrate, heat-treatment was given for 1 hour at 175° C. and then the number of the stearyl group per repeating unit was measured by infrared spectrum and nuclear magnetic resonance spectrum. The result was 1.4.

EXAMPLE 2

Glass substrates with the LB films formed thereon in the same manner as in Example 1 were heat-treated for 1 hour at 195° C. and a TN-type liquid crystal cell and an anti-parallel liquid crystal cell were obtained.

Both cells were uniform in liquid crystal orientation condition and the liquid crystal pretilt angle measured by the crystal rotation method was 0.4° (deg.). The number of stearyl groups per repeating unit was 1.1.

EXAMPLE 3

Glass substrates with the LB films formed thereon in the same manner as in Example 1 were heat-treated for 1 hour at 205° C. and a TN-type liquid crystal cell and an anti-parallel liquid crystal cell were obtained.

Both cells were uniform in liquid crystal orientation condition and the liquid crystal pretilt angle, measured by the crystal rotation method was 0.2° (deg.). The number of stearyl groups per repeating unit was 0.8.

COMPARATIVE EXAMPLE 1

Glass substrates with the LB films formed thereon was heat-treated for 1 hour at 150° C. and a TN-type liquid crystal cell and an anti-parallel liquid crystal cell were obtained.

Liquid crystals of the both cells were homotropically orientated. The liquid crystal pretilt angle measured by the crystal rotation method was approx. 90° (deg.) and the number of stearyl groups per repeating unit was 1.6.

COMPARATIVE EXAMPLE 2

Glass substrates with the LB films formed thereon in the same manner as in Example 1 were heat-treated for 1 hour at 220° (deg.) and a TN-type liquid crystal cell and an anti-parallel liquid crystal cell were obtained. When the obtained crystal cell was statically driven, there occurred a reverse tilt disclination.

The liquid crystal pretilt angle measured by the crystal rotation method was perfectly 0° (deg.) and the number of stearyl group per repeating unit was 0.6.

POSSIBILITY OF INDUSTRIAL UTILIZATION

As explained above, according to the present invention, it is possible to provide a liquid crystal orientation film showing a uniform and defectless liquid crystal orientation property, the pretilt angle of which is controllable even without relying upon the oblique vapor deposition method or rubbing method.

What is claimed is:

1. A method for manufacturing a liquid crystal orientation film which comprises preparing a thin film by laminating a monomolecular film to a substrate having an electrode formed thereon, said monomolecular film being formed by spreading on a water surface an amphiphilic high molecular material having the repeating unit

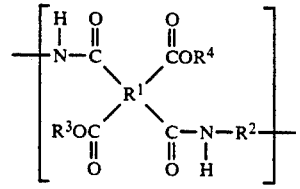

wherein $R^1$ is a tetravalent group containing at least two carbon atoms, $R^2$ is a divalent group containing at least two carbon atoms; and each of $R^3$ and $R^4$ is hydrogen or an aliphatic, an alicyclic or an aromatic monovalent group having 1-30 carbon atoms or a combination thereof, which may be substituted by a halogen atom, a nitro group, an amino group, a cyano group, a methoxy group or an acetoxy group, and both $R^3$ and $R^4$ are not hydrogen; and partially imidizing the thin film to form polyimide units of the formula

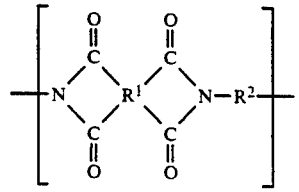

wherein $R^1$ and $R^2$ are the same as above and the number of monovalent groups having 12-30 carbon atoms remaining in the imidized film is 1.5–0.8 groups per repeating unit.
2. The method according to claim 1 wherein
$R_1$ is
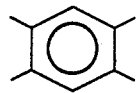
and
$R_2$ is
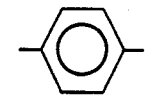
* * * * *